United States Patent [19]

Hopman

[11] 4,149,589
[45] Apr. 17, 1979

[54] SELF-INSULATING WATER WALL

[76] Inventor: Fred Hopman, P.O. Box 171, Arroyo Seco, N. Mex. 87514

[21] Appl. No.: 854,895

[22] Filed: Nov. 25, 1977

[51] Int. Cl.² .............................................. F28D 15/00
[52] U.S. Cl. ...................... 165/32; 126/271; 165/49; 165/104 S; 165/106; 165/DIG. 6
[58] Field of Search ................... 165/48, 49, 32, 106, 165/104 S; 126/270, 271

[56] References Cited

U.S. PATENT DOCUMENTS

| | | | |
|---|---|---|---|
| 2,484,127 | 10/1949 | Stelzer | 126/270 X |
| 2,553,073 | 5/1951 | Barnett | 126/270 X |
| 2,693,939 | 11/1954 | Marchant et al. | 126/271 X |
| 3,563,305 | 2/1971 | Hay | 165/53 X |
| 3,987,782 | 10/1976 | Meier, Jr. | 126/271 |
| 4,003,367 | 1/1977 | Wikholm | 165/106 X |
| 4,006,856 | 2/1977 | Nilsson | 126/270 X |
| 4,050,508 | 9/1977 | Buckley | 165/106 X |
| 4,064,867 | 12/1977 | Schlesinger | 126/271 |

*Primary Examiner*—Albert W. Davis, Jr.
*Attorney, Agent, or Firm*—Cushman, Darby & Cushman

[57] ABSTRACT

A self-insulating water wall designed to modify the temperature of a region. Each water wall module is a single container that uses solar energy or the night environment to create convection currents which either heat or cool a storage fluid. The invention is switched between its heating and cooling modes by movement of a lever. A baffle in the container aids in maintaining the efficiency of the energy storage. A door selectively covers the wall of the container in contact with the outside environment. The inner-surface of the door is a reflector to increase the efficiency of the energy-radiating process when the door is in its open position.

30 Claims, 10 Drawing Figures

SELF-INSULATING WATER WALL

BRIEF DESCRIPTION OF THE BACKGROUND AND SUMMARY OF THE INVENTION

The invention relates to a passive heat exchange apparatus which uses solar energy or the temperature differential between the outside environment and an enclosed region to provide either heating or cooling for that region. This region could be either the interior of a home or factory, or it could alternatively be a water heater or cooler.

Heating and cooling devices powered either by fossil fuels of electricity generated from fossil fuels are necessary in almost every habitation. However, as the world supply or fossil fuel dwindles, alternative sources of energy are becoming increasingly important in order to preserve the remaining supply of fossil fuels as long as possible. The use of solar energy is one such alternative. The widespread use of solar heating and cooling devices including the present invention would drastically reduce the demand for fossil fuels.

Solar heating or cooling in this type of device is generally accomplished by transfer of energy by radiation onto a panel, by conduction into a fluid adjacent the panel and by convection currents within tanks which have a structure permitting the convection currents to flow in one direction, but prohibiting flow in the reverse direction. Radiation to or from the unit effects the heat transfer. This uni-directional flow guarantees that the direction of heat flow into or out of the enclosed region will not be reversed by convection currents flowing in the opposite direction. A number of different solar heat exchangers have been developed. The patents to Meier, U.S. Pat. No. 3,987,782, Stelzer, U.S. Pat. No. 2,484,127, and Barnett, U.S. Pat. No. 2,553,073, all disclose solar heat exchange devices with valves to prohibit the reverse flow of a heat-transfer fluid to prevent undesired heat transfers. However, the valves used in all of these devices are mechanical in nature, with moving parts that are susceptible to failure. The patents to Marchant et al, U.S. Pat. No. 2,693,939, Nilsson, U.S. Pat. No. 4,006,856, and Hay, U.S. Pat. No. 3,563,305, also disclose environmental heating and cooling systems using a convection process.

An article by Shawn Buckley, entitled "Thermic Diodes Solar Panels: Passive and Modular", discloses the use of solar energy in a heating and cooling system. In Buckley's system, convection currents carry a fluid, such as water, vertically in a thin layer through a first tank exposed to solar radiation which heats the fluid. The heated fluid passes through additional plumbing and a complex oil check valve in a second tank to a third tank separated from the first, which stores the heated fluid until the heat is transferred into a room, or through a heat exchanger to warm other fluids. The check valve prevents the reverse flow that occurs when the outside temperature becomes lower than the temperature in the storage tank, thereby dissipating the energy stored in the tank. This valve contains a layer of denser heat transferring fluid such as water, and a layer of less dense immiscible fluid such as oil floating upon the denser layer. A riser tube extends vertically into the oil layer so that as the water in the thin layer is warmed by the sun, pressure in the riser tube forces the water to flow out of the tube and settle back into the water layer, thereby permitting the water to circulate in one direction. When the outside temperature drops below the temperature of the storage tank, a convection current attempts to flow in the reverse direction, causing the water layer in a check valve to rise, thereby forcing oil partially down the riser tube. However, when the less dense oil has advanced a certain distance down the riser tube, the average density in the riser tube and the thin layer will balance the average density in the storage tank and the check valve, thereby stopping flow. By disconnecting and reversing to the check valve, the device will operate in the cooling mode.

The present invention makes a number of advances over the prior art. The three functions of energy absorption, energy storage and prevention of reverse convection currents are all performed within a single container This unique feature provides a number of significant advantages. The circulation of the convection currents in the present invention is greatly improved over the prior art. By merging the various functions into a single container, a circulation free of the restrictions typical of more conventional plumbing has been achieved. The lower density layer floats directly on the higher density layer in a single tank in contrast to the system of Buckley, so that the hydraulic pressures in the heat transfer fluid act directly rather than transferring the hydraulic pressures to a valve compartment. Also, the present invention greatly reduces the problem of joint and seam leakage, since first, the total length of seams around the one tank is much less than the total length of seams around the tanks of a multi-tank design of similar capacity, and second, inter-tank connections have been eliminated.

The Meier U.S. Pat. No. 3,987,782, discloses a single tank design with a check valve, but the valve, a bimetallic strip, is not so sensitive or effective as the fluid valve of the present invention, and the overall design of the present invention is much simpler, effecting a great reduction in cost.

A unique feature of the present invention is that it provides for switching between its heating and cooling modes by simply moving a lever. A number of advantages are also inherent in the use of a two-liquid valve. The absence of moving parts eliminates the possibility of mechanical breakdown. Also, the two-liquid valve is much more sensitive than its mechanical counterpart so that the slightest differential in temperature will cause convection currents to flow. A combination of the advantages of a two-liquid valve and the advantages of flexible conversion between heating and cooling inside a single tank make the present invention a truly unique advance over the previous convection type heat exchangers.

Several features further improve the efficiency of the present invention. A baffle placed near the valveless inter-connection between the energy absorption area and the energy storage area aids in maintaining the temperature differential between these two areas when fluid is not flowing over the valve, without impeding the flow of convection currents when fluid is flowing over the valve. If desired, a door or louver system can be pivotably mounted to the wall of the container in contact with the outside environment. The surface of the door or louver system adjacent to the water wall can be of reflective material so that when the door is in an open position, energy radiated from the device can be reflected away, in the cooling mode, and radiation can be reflected towards the device in the heating mode.

Many other objects and purposes will become clear from the following detailed description of the drawings.

BRIEF DESCRIPTION OF THE DRAWINGS

FIG. 1a shows a perspective view of an embodiment of the self-insulating water wall having a heating and cooling mode controller;

FIG. 1b shows a sectional view of the embodiment in FIG. 1a;

FIG. 1c shows an enlarged sectional part of FIG. 1a;

FIG. 2 shows a ceiling-wall embodiment of the invention;

DETAILED DESCRIPTION OF THE DRAWINGS

Figures 1A, 1B, 1C, 2:
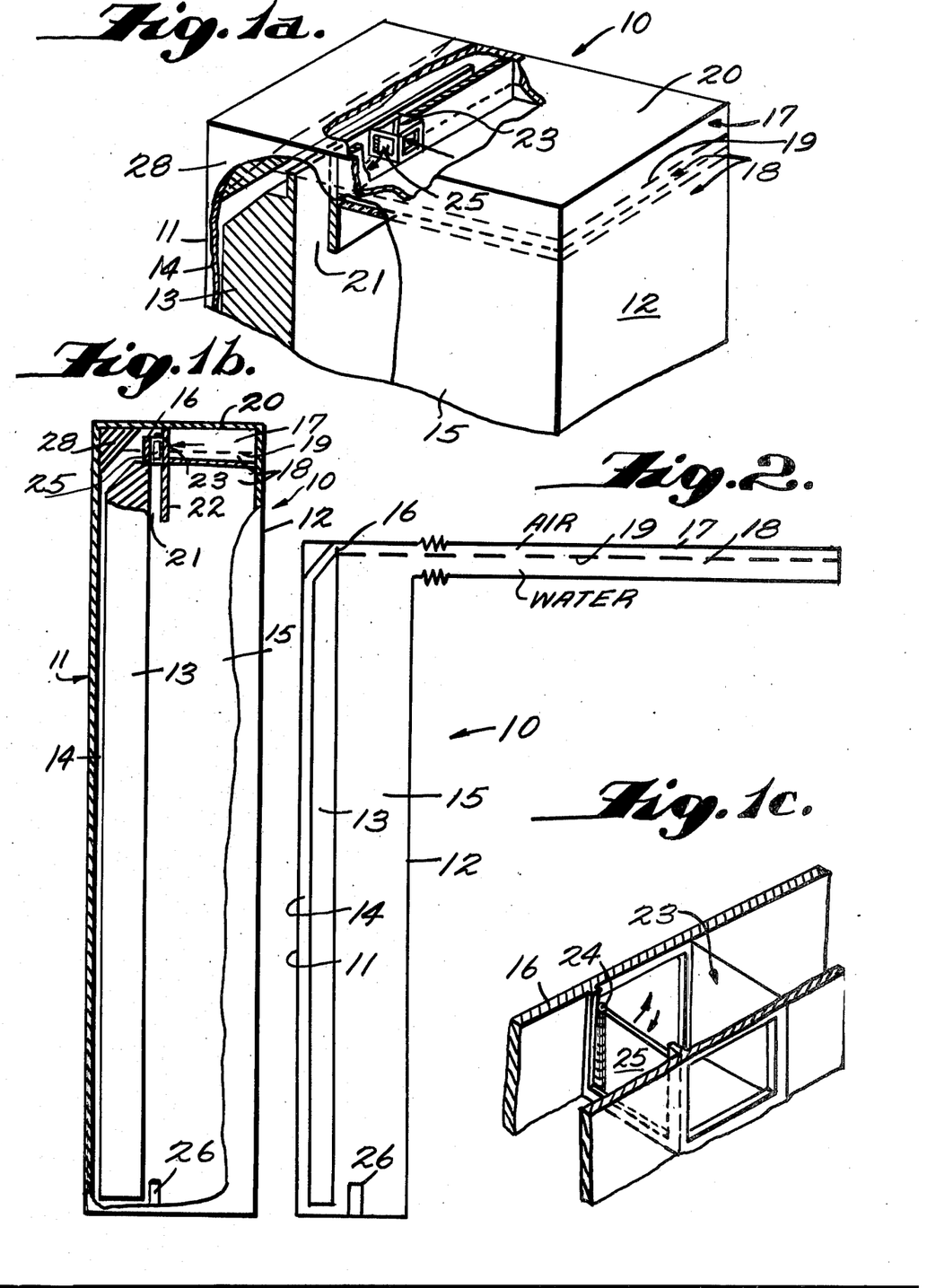

Reference is now made to FIGS. 1a and 1b which illustrate one embodiment of the present invention having a heating and cooling mode controller. The basic structural element of the invention is container 10 which can be of any size, shape or material. Side 11 of container 10 faces the outside environment to absorb or radiate energy depending on the mode of operation. The opposite side 12 of container 10 either interfaces with the environment of an enclosed structure, radiating heat into it or absorbing heat from it, or is insulated from the environmental external to container 10 so that the collected energy is stored within the container. Container 10 must have an inlet/outlet opening and may have a peephole and a fluid level control, such as a float. The tank top can be open to the atmosphere to prevent pressure buildup from thermal expansion of the fluid. The container may be made out of stainless steel, galvanized steel, rolled steel, fiberglass and resin, other plastics or metals, or other materials used in tank manufacture.

Insulation 13, positioned within container 10 so as to create narrow flow channel 14 between wall 11 and insulation 13 and storage area 15 between wall 12 and insulation 13, permits fluid to flow both above and beneath the insulation. The purpose of the insulation is to thermically isolate the fluid in flow channel 14 and the outside environment from the fluid in storage area 15. Insulating baffle 28 further aids in the thermic isolation. The insulation 13 may be polystyrene, urethane or the equivalent, and may vary in thickness depending on the use. Thinner insulation permits more heat to escape from the storage area to the flow channel and vice versa. For long-term storage of heat in large volumes (e.g., summer storage for winter use), the thickness may be considerable.

The common characteristics of the above-suggested insulation materials is their compressibility. The flow channel 14 may freeze during the winter months in colder climates. The ice formed will be able to expand into the yielding material so as to prevent damage to container 10. However, antifreeze or the equivalent may be added to prevent freezing.

Insulation 13 supports rigid, carefully leveled lip 16 at its uppermost extreme. Lip 16 is crucial in the operation of the valve as described below.

Container 10 is filled with two immiscible fluids 17 and 18, where the density of fluid 18 is greater than the density of fluid 17, e.g., the denser fluid may be water, and the less dense fluid may be silicone. The interface 19 of the two fluids is at a level just below lip 16. The positioning of interface 19 with respect to the top of lip 16 is less critical if the density of the two fluids is similar.

Chamber 20, located in the upper portion of storage area 15, must have its bottom below interface 19. A circulation channel 21 is defined on one side by wall 22, and on the other side by lip 16 and insulation 13.

Valve 23 has openings to chamber 20, flow channel 14 (through lip 16) and circulation channel 21. The lower and upper surfaces of valve 23 must be respectively below and above interface 19. Regulator 25 is attached by means of hinge 24 to lip 16 so as to permit regulator 25 to cover the opening to either flow channel 14 or circulation channel 21. The function of valve 23 can alternatively be performed by any combination of conduits and valves that either blocks access to flow channel 14, while permitting flow between chamber 20 and circulation channel 21 or blocks access to circulation channel 21, while permitting flow between chamber 20 and flow channel 14.

When the device is in the heating mode, regulator 25 is positioned by means of a manual control (not shown) extending to a position external to container 10 so that chamber 20 communicates with circulation channel 21 through valve 23, effectively placing the large area of interface 19 in chamber 20 on the storage area 15 side of lip 16. When solar radiation strikes wall 11 of container 10, the fluids in flow channel 14 are heated. The buoyancy of the fluids on the flow channel side of insulation 13 becomes greater than the buoyancy of the fluids on the storage area side of insulation 13, causing fluid 17 in the flow channel to displace the relatively small amount of fluid 18 in the upper region of the flow channel, permitting fluid 17 to flow over lip 16 and heat storage area 15.

If the temperature of the fluids in flow channel 14 drops below the temperature of the fluids in storage area 15, due to a change in the outside environment, the buoyancy of fluids in storage area 15 will become greater than the buoyancy of fluids in the flow channel 14. However, due to the large interface 19 area in chamber 20, communicating through valve 23 with the storage area 15 side of lip 16, a very slight rise in the level of interface 19 in storage area 15 will effect a much larger drop in the level of interface 19 in flow channel 14. The average density of the two fluids on the flow channel 14 side of lip 16 will balance the average density of the two fluids on the storage area 15 side of lip 16 (so that no more fluid 17 will flow over lip 16) before fluid 18 in storage area 15 reaches the level of the upper edge of lip 16.

Thus, fluid 18 is permitted to circulate during the period it is being heated by the solar radiation through the wall 11, but is not permitted to circulate if the temperature of wall 11 should drop below the temperature of fluid 18 in storage area 15. Insulation 13 will then prohibit the energy stored in storage area 15 from radiating back to the outside environment. In determining the distance between fluid interface 19 and the top of lip 16, one must be certain that, at the most extreme temperature differences between the storage area 15 and the flow channel 14, the level of fluid 18 in storage area 15 is below the upper edge of lip 16.

In the cooling mode, regulator 25 is positioned by means of a manual control (not shown) extending to a position external to container 10, so that the fluids in chamber 20 communicate with the fluids in flow channel 14 through valve 23. When the temperature of the fluids in flow channel 14 is lower than the temperature of the fluids in storage area 15, the greater buoyancy of fluids in storage area 15 (as compared to the buoyancy of the fluids in flow channel 14) causes fluid 18 in storage area 15 to rise through circulation channel 21 and flow over lip 16 into flow channel 14. Thus the cooler fluid 18 in flow channel 14 is drawn under insulator 13 into storage area 15, cooling the storage area.

If the temperature of the fluids in flow channel 14 should become greater than the temperature of the fluids in storage area 15, the greater buoyance of the fluids in the flow channel will cause fluid 18 in that channel to rise. However, because the large interface 19 area in chamber 20 communicates with interface 19 area on the flow channel 14 side of lip 16, a slight rise in the interface level on the flow channel 14 side of lip 16 will cause a much larger drop in the interface 19 level in circulation channel 21. The density of the fluids in flow channel 14 side of lip 16 will balance the density of the fluids in storage area 15 side of lip 16 (thus stopping the flow of fluids over lip 16) before fluid 18 from the flow channel 14 rises over lip 16.

Thus, in the cooling mode, fluid 18 will circulate only to reduce the temperature of the fluid in storage area 15. If the temperature of the fluids in flow channel 14 becomes greater than the temperature of the fluids in storage area 15, the convection flow will stop. Insulator 13 will then isolate the cooler fluids in storage area 15 and the region being cooled from the warmer outside environment.

Baffle 26, running parallel to wall 11, is attached to the bottom and sides of container 10, and extends upward from the bottom so that the top baffle 26 is a bit higher than the bottom of insulator 13. Baffle 26 is spaced far enough from insulator 13 so that when fluid 18 is flowing in either direction over lip 16, baffle 26 does not interfere with the flow of fluid 18 under insulator 13. However, when fluid 18 is not flowing over lip 16, baffle 26 aids in preventing the mixing of the fluid in flow channel 14 and storage area 15, thereby aiding in the maintenance of the temperature differential between storage area 15 and the outside environment.

Reference is now made to FIG. 2 which illustrates a ceiling/wall radiator embodiment of the present invention. This embodiment functions with water being fluid 18 and air being fluid 17. The illustrated embodiment is designed to operate only in the heating mode, but modifications obvious in light of the above discussion could be made to convert the embodiment to operate either only in the cooling mode, or in either mode selectively. The large difference in the densities of air and water necessitates an extremely large difference in the amount of the interface 19 area between the flow channel 14 and the storage area 15 sides of lip 16 so that the greater buoyancy of warmer water in flow channel 14 will cause the water to rise over lip 16. For this reason, an extension of the tank is placed in the ceiling to both increase the area of radiation and to increase the interface 19 area on the storage area 15 side of lip 16. In addition, the ceiling extension contains a majority of the heated fluid, so that the wall portion of storage area 15 contains relatively cooler fluid, thereby increasing the efficiency of the system by increasing the temperature differential between storage area 15 and flow channel 14, which promotes convection.

Figures 3A, 3B, 3C:
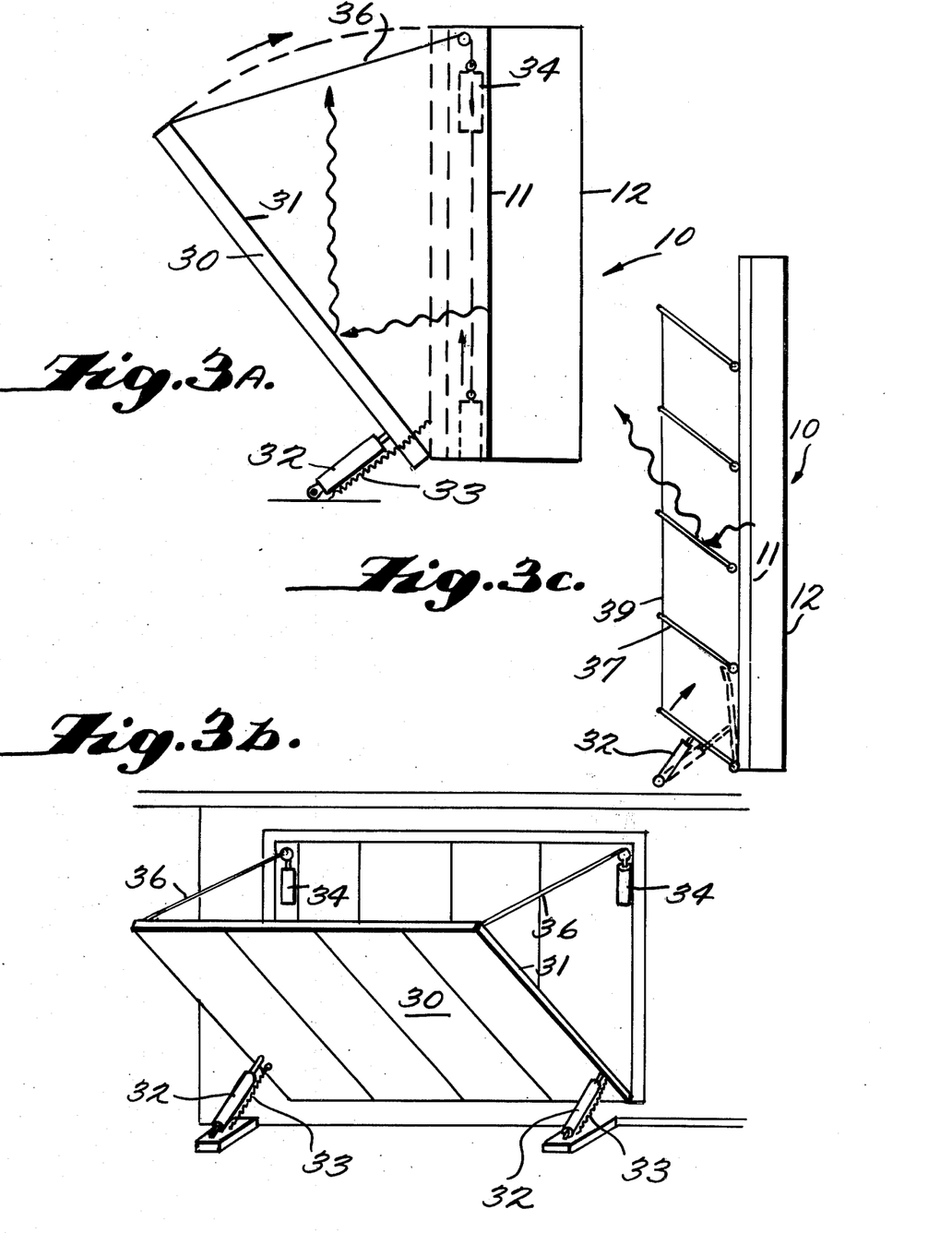
FIGS. 3a and 3b show a door/reflector portion of the invention.
FIG. 3c shows a plurality of louvers controlled by a heat sensitive piston.

FIG. 3 illustrates the door/reflector portion of the present invention. Door 30 hinges on the bottom, with its position controlled by heat sensitive piston 32. Spring 33 aids piston 32 in the initial opening of the door. Counterweights 34 attached to door 30 by lines 36 assist heat sensitive pistons 32 in supporting the weight of the door in the open position. Door 30 is comprised of one or two layers of light transmissive material such as glazing material.

As shown in FIG. 3c, door 30 may alternatively be comprised of louvers 37 over wall 11, constructed of a reflective and/or insulative material. The individual louvers are connected by means of linkage 39. The louvers 37 are opened by piston 32 at night during the cooling mode to reflect radiation from wall 11, and closed by piston 32 during the day in the cooling mode to prevent radiation from being incident on wall 11. In the cooling mode, door 30, or louvers may be opened so that heat energy radiated from wall 11 is reflected off of surface 31 into the outside environment.

In the heating mode, when the door is closed radiation penetrates the glazing material to heat flow channel 14.

Figures 4, 5A, 5B:
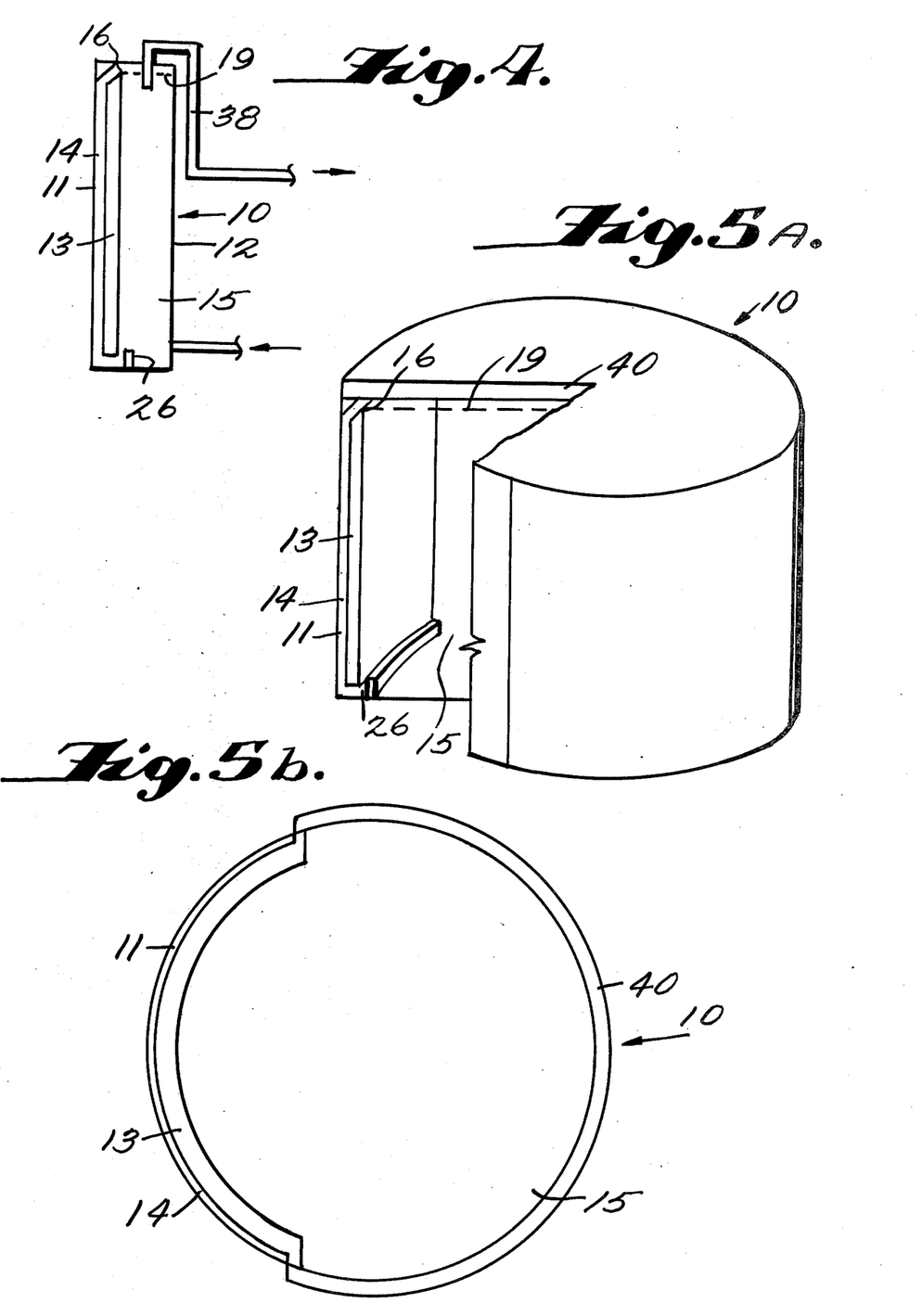
FIG. 4 shows a schematic view of an embodiment for using the stored energy externally from the invention.
FIGS. 5a and 5b show a schematic view of an alternative embodiment of the invention.

FIG. 4 illustrates an embodiment for using the energy stored in storage area 15 externally from container 10. The illustrated embodiment is designed to operate only in the heating mode, but modifications could be made to convert the embodiment to operate either in the cooling mode or in either mode selectively. Pipe 38 extends into the warmer upper region of storage area 15 to draw off heated fluid 18 for external uses, such as direct use as a domestic hot water supply, as an energy source for an external radiating unit, as preheated input water for a more conventional water heater, or as an energy source for another heat exchanger.

FIG. 5 illustrates an alternative cylindrical-shaped construction for container 10, useful in conjunction with the embodiment illustrated in FIG. 4. The entire outer surface of container 10 is covered with insulation 40 except for the tank surface 11 that is exposed to the outside environment to absorb or radiate energy. Again, the embodiment illustrated in FIG. 5 operates only in the heating mode, but it would be possible to reconstruct the embodiment so that it is capable of operating either only in the cooling mode or in either selectively. For large volumes, air and water would be adequate as the two fluids.

A tank of any other shape is also possible. For example, curved wall tanks or barrel shaped tanks may be particularly advantageous in particular applications.

In cold and temperate climates, the door may have one or two layers of glazing or translucent material while in the heating mode so that the captured solar energy is not lost by conduction to the cold environment. These layers may have to be removed if the cooling load during the summer is great, so as to improve the heat radiating efficiency of the invention. In warmer climates, a honeycomb structure over wall 11, made of a reflective material, may be helpful to inhibit wind loss during heating modes, while permitting container surface 11 direct exposure to the night environment during cooling modes.

The volume of the storage area 15 of each water wall module in relation to the flow channel surface area determines the average temperature swing which the storage area will go through in 24 hours. A large storage area 15 will go through small temperature changes while a small storage area will, on the average, go through appreciable temperature swings. Sufficient thermal mass in the structure to be heated or cooled keeps the temperature relatively even. If, however, the structure becomes too hot or cold, an insulated curtain may be drawn over wall 12. Depending on the climate and the number of self-insulating water wall modules used, a back-up heating system may be necessary.

If the invention is to be used year-round or at an area of fairly low latitude, it may be desirable to slant the tank as much as 45°. This will permit the most efficient absorption of solar radiation by flow channel 14.

Although only a few exemplary embodiments of this invention have been described in detail above, those skilled in the art will readily appreciate that many modifications are possible in the exemplary embodiments without materially departing from the novel teachings and advantages of this invention. In place of the regulator 25 and associated valves 23, any suitable valve or other arrangement for controlling flow can be utilized. One alternative is a cylinder having a passage therethrough which can be rotated to respectively connect circulation channel 21 or flow channel 14 to chamber 20. Accordingly, all such modifications are intended to be included within the scope of this invention as defined in the following claims.

What is claimed is:

1. A heat exchange apparatus for varying the temperature within a region at least partially enclosed from the outside environment including:
    a container having a plurality of walls enclosing an interior space including a first wall which is exposed to said region and a second wall which is exposed to the outside environment;
    a sheet of insulation within said container mounted substantially parallel and close to said second wall, separating said interior space into a storage area adjacent to said first wall, and a narrow flow channel adjacent to said second wall and connected to said storage area at vertically separated locations;
    a horizontal lip on said insulation at the upper of said vertically separated locations;
    a first fluid filling said container to a level just below the upper edge of said lip; and
    a second fluid, of lighter density than said first fluid, above said first fluid and immiscible with said first fluid, extending down over said lip.

2. The apparatus as in claim 1 further including:
    means for forming a chamber within said storage area of said container, including a bottom and a side, said bottom being below the interface of said first fluid and said second fluid, for providing a large area of interface between said first fluid and said second fluid;
    a narrow circulation channel comprising a first side and a second side, said first side being said lip and said insulation and said second side being said side of said chamber and downward extension thereof for connecting said upper of said vertically separated locations with said storage area;
    means defining a first passage extending from said chamber through said lip to said flow channel, the bottom edge of said first passage being below the surface of said first fluid, the upper edge of said first passage being above the surface of said first fluid, for connecting said large area of interface with the interface of said first fluid with said second fluid on said flow channel side of said lip;
    and a second passage extending from said chamber to said circulation channel, the bottom edge of said second passage being below the surface of said first fluid, the upper edge of said second passage being above the surface of said first fluid for connecting said large area of interface with the interface of said first fluid and said second fluid on said circulation channel side of said lip; and
    means for selectively blocking either said first passage or said second passage so that the apparatus can be easily altered either to heat or to cool.

3. The apparatus as in claim 1, wherein said second fluid is air, and said first fluid is water and wherein the interface between said fluids is contained in a horizontal extension of said container.

4. The apparatus as in claim 1 further comprising means for inhibiting the mixing of said first fluid in said flow channel with said first fluid in said storage area near the lower of said vertically separated locations when said first fluid is not flowing over said lip.

5. The apparatus as in claim 4, wherein said inhibiting means is a baffle mounted parallel to said second wall, attached to the bottom and sides of said container, extending upwards from the bottom of said container to a short distance above the bottom edge of said insulation, located in said storage area about a distance from said insulation substantially equal to the distance of said insulation from the bottom of said container.

6. The apparatus as in claim 1 further comprising means for covering said second wall and means for uncovering said second wall for cooling.

7. The apparatus as in claim 6, wherein said means for covering further comprises:
    a door hinged at the bottom having light transmissive material; and
    a heat sensitive piston for operating said door.

8. The apparatus as in claim 6, wherein said means for covering further comprises:
    a system of reflective louvers; and
    a heat sensitive piston connected to and driving said system of louvers so that in the cooling mode when said system of louvers is in the open position, radiation is reflected away from said second wall and when said system of louvers is in the closed position, radiation is prevented from being incident on said second wall.

9. The apparatus as in claim 1 further comprising means for conveying said first fluid in said storage area to locations external to said container.

10. The apparatus as in claim 9 wherein said first wall further comprises further insulation for thermically isolating the energy stored in said storage area from the rest of said region.

11. A heat exchange apparatus for varying the temperature within a region at least partially enclosed from the outside environment including:
    a container having a plurality of walls enclosing an interior space including a first wall which is exposed to said region and a second wall which is exposed to the outside environment;
    a sheet of insulation within said container mounted substantially parallel and close to said second wall, separating said interior space into a storage area adjacent to said first wall, and a narrow flow channel adjacent to said second wall and connected to said storage area at vertically separated locations;

a horizontal lip on said insulation at the upper of said vertically separated locations;

means for forming a chamber within said storage area of said container, including a bottom and a side, said bottom of said chamber being below the interface of said first fluid and said second fluid, for providing a large area of interface between said first fluid and said second fluid;

a narrow circulation channel comprising a first side and a second side, said first side being said lip and said insulation and said second side being said side of said chamber and downward extension thereof, for connecting said upper of said vertically separated locations with said storage area;

a first fluid filling said container to a level just below the upper edge of said lip;

a second fluid, of lighter density than said first fluid, above said first fluid and immiscible with said first fluid, extending over said lip;

means defining a first passage extending from said chamber through said lip to said flow channel, the bottom edge of said first passage being below the surface of said first fluid, the upper edge of said first passage being above the surface of said first fluid for connecting said large area of interface with the interface of said first fluid and said second fluid on said flow channel side of said lip and a second passage extending from said chamber to said circulation channel, the bottom edge of said second passage being below the surface of said first fluid, the upper edges of said second passage being above the surface of said first fluid for connecting said large area of interface with the interface of said first fluid and said second fluid on said circulation channel side of said lip; and means for selectively blocking either said first passage or said second passage so that the apparatus can be easily altered either to heat or to cool.

12. The apparatus as in claim 11, wherein said second fluid is air, and said first fluid is water and wherein the interface between said fluids is contained in a horizontal extension of said container.

13. The apparatus as in claim 11 further comprising means for inhibiting the mixing of said first fluid in said flow channel with said first fluid in said storage area near the lower of said vertically separated locations when said first fluid is not flowing over said lip.

14. The apparatus as in claim 13 wherein said inhibiting means is a baffle mounted parallel to said second wall, attached to the bottom and sides of said container, extending upwards from the bottom of said container to a short distance above the bottom edge of said insulation, located in said storage area about a distance from said insulation substantially equal to the distance of said insulation from the bottom of said container.

15. The apparatus as in claim 11 further comprising means for covering said second wall and means for uncovering said second wall for cooling.

16. The apparatus as in claim 15 wherein said means for covering further comprises:

a system of reflective louvers; and a heat sensitive piston connected to and driving said system of louvers so that in the cooling mode when said system of louvers is in the open position, radiation is reflected away from said second wall and when said system of louvers is in the closed position, radiation is prevented from being incident on said second wall.

17. The apparatus as in claim 11 further comprising means for conveying said first fluid in said storage area to location external to said container.

18. The apparatus as in claim 17 wherein said first wall further comprises further insulation for thermically isolating the energy stored in said storage area from the rest of said region.

19. A heat exchange apparatus for varying the temperature within a region at least partially enclosed from the outside environment including:

a container having a plurality of walls enclosing an interior space including a first wall which is exposed to said region and a second wall which is exposed to the outside environment;

a sheet of insulation within said container, mounted substantially parallel and close to said second wall, separating said interior space into a storage area adjacent to said first wall, and a narrow flow channel adjacent said second wall and connected to said storage area at vertically separated locations;

a horizontal lip on said insulation at the upper of said vertical separated locations;

a first fluid filling said container to a level just below the upper edge of said lip;

a second fluid, of lighter density than said first fluid above said first fluid and immiscible with said first fluid, extending down over said lip; and means for inhibiting the mixing of said first fluid in said flow channel with said first fluid in said storage area near the lower of said vertically separated locations when said first fluid is not flowing over said lip.

20. The apparatus as in claim 19, wherein said inhibiting means is a baffle mounted parallel to said second wall, attached to the bottom and sides of said container, extending upward from the bottom of said container to a short distance above the bottom edge of said insulation, located in said storage area about a distance from said insulation substantially equal to the distance of said insulation from the bottom of said container.

21. The apparatus as in claim 19, wherein said second fluid is air, and said first fluid is water and wherein the interface between said fluids is contained in a horizontal extension of said container.

22. The apparatus as in claim 19 further comprising means for covering said second wall and means for uncovering said second wall for cooling.

23. The apparatus as in claim 22, wherein said means for covering further comprises:

a system of reflective louvers; and a heat sensitive piston connected to and driving said system of louvers so that in the cooling mode when said system of louvers is in the open position, radiation is reflected away from said second wall and when said system of louvers is in the closed position, radiation is prevented from being incident on said second wall.

24. The apparatus as in claim 19 further comprising means for conveying said first fluid in said storage region to locations external to said container.

25. The apparatus as in claim 24 wherein said first wall further comprises further insulation for thermically isolating the energy stored in said storage area from the rest of said region.

26. A heat exchange apparatus for varying the temperature within at least a region partially enclosed from the outside environment including:
- a container having a plurality of walls enclosing an interior space including a first wall which is exposed to said region and a second wall which is exposed to the outside environment;
- a sheet of insulation within said container mounted substantially parallel and close to said second wall, separating said interior space into a storage area adjacent to said first wall, and a narrow flow channel adjacent to said second wall and connected to said storage area at vertically separated locations;
- a horizontal lip on said insulation at the upper of said vertically separated locations;
- a first fluid filling said container to a level just below the upper edge of said lip;
- a second fluid, of lighter density than said first fluid, above said first fluid and immiscible with said first fluid, extending down over said lip; and
- means for covering said second wall and means for uncovering said second wall for cooling.

27. The apparatus as in claim 26 wherein said means for covering further comprises:
- a system of reflective louvers; and
- a heat sensitive piston connected to and driving said system of louvers so that in the cooling mode when said system of louvers is in the open position, radiation is reflected away from said second wall and when said system of louvers is in the closed position, radiation is prevented from being incident on said second wall.

28. The apparatus as in claim 26 wherein said second fluid is air, and said first fluid is water and wherein the interface between said fluids is contained in a horizontal extension of said container.

29. The apparatus as in claim 26 further comprising means for conveying said first fluid in said storage area to locations external from said container.

30. The apparatus as in claim 29 wherein said first wall further comprises insulation for thermally isolating the energy stored in said storage area from the rest of said region.

* * * * *

UNITED STATES PATENT AND TRADEMARK OFFICE
CERTIFICATE OF CORRECTION

PATENT NO. : 4,149,589
DATED : April 17, 1979
INVENTOR(S) : Fred Hopman

It is certified that error appears in the above-identified patent and that said Letters Patent are hereby corrected as shown below:

IN THE SPECIFICATION:

Column 4, line 39, change "17" to --18--;

Column 4, line 41, change "18" to --17--;

Column 4, line 42, change "17" to --18--; after "lip 16 and" insert --into--.

Signed and Sealed this

Thirtieth Day of October 1979

[SEAL]

Attest:

RUTH C. MASON
Attesting Officer

LUTRELLE F. PARKER
Acting Commissioner of Patents and Trademarks